Sept. 22, 1931.  E. P. HOLDER  1,824,598
PAINTING CHART
Filed July 23, 1928
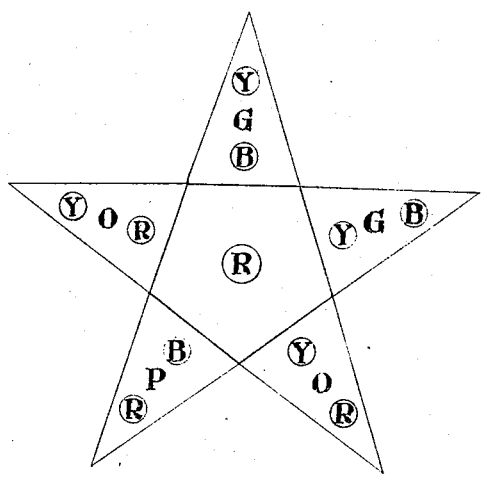
INVENTOR.
Edward P. Holder
BY
Parsons & Bodell
ATTORNEYS.

Patented Sept. 22, 1931

1,824,598

UNITED STATES PATENT OFFICE

EDWARD P. HOLDER, OF NEW YORK, N. Y.

PAINTING CHART

Application filed July 23, 1928. Serial No. 294,861.

This invention relates to amusement and educational devices and has for its object, a device by which children can unconsciously learn colors and the mixing of two or more colors to produce other colors or shades.

The invention consists in the novel features and in the combinations and constructions hereinafter set forth and claimed.

In describing this invention, reference is had to the accompanying drawing which is a representation of a figure as the outline of a star divided into subdivisions to be colored differently.

The invention comprises primarily a sheet as a sheet of paper having the outline of a figure thereon and lines or other demarcations dividing the figure into subdivisions to be colored differently.

The figure here illustrated is a star, the center part and the points of which are to be colored differently. The center part of the star is shown as having a spot or daub R of red water color paint or coloring matter soluble in water and two of the points with yellow and blue spots or daubs Y, B and an indication G that when spread with a wet brush, they will produce green. Other portions or points are shown as having two spots of different color paint, one as red and yellow and an indication O as when they are spread out together they produce orange; and another point with blue and red spots or daubs with the indication P that when spread together they will produce purple.

Thus a child by wetting a brush and spreading different colored spots together, readily learns what colors the mixtures produce and unconsciously becomes familiar with colors.

These sheets can be put up in book form and there are no mussy boxes of paints to be left in disorder, or if desired, the sheet of paper may have only the spots or daubs of water colors thereon so that the child is free to originate his own designs and own coloring.

What I claim is:

1. An educational device, for teaching children colors, comprising a chart having an outline of a figure thereon; lines dividing the figure into divisions; a plurality of spots of water color paints of different color disposed on the chart within a division of the figure; and an indication on the chart within said division of the figure giving the name of the color obtained by a mixing of the colors which are disposed in that division of the figure.

2. As a new article of manufacture a sheet having the outline of a figure thereon with lines dividing the figure into a plurality of sections, water color paint of a given color placed on a portion of one of the sections, water color paint of a different color placed on another portion of the same section, so that the movement of a wet brush over the area of said section will spread the two water color paints and color said section the color produced by the mixture of the two original colors.

3. As a new article of manufacture, a chart having the outline of a figure thereon, lines indicating divisions of the figure, a portion of each division being covered with a water color paint and another portion of each division being covered with a water color paint of a different color than the first paint, so that when the different color water color paints are spread together with a wet brush they will color the division a color different from that of either of the original colors, each division being provided with an indication of the color to be produced by the mixture of the two paints of that division.

In testimony whereof, I have hereunto signed by name at New York city, in the borough of Manhattan, and in the State of New York, this 17th day of July, 1928.

EDWARD P. HOLDER.